US011193368B2

(12) United States Patent
Vera et al.

(10) Patent No.: US 11,193,368 B2
(45) Date of Patent: Dec. 7, 2021

(54) NANOTRACER FOR OIL RECOVERY COMPRISING AN OCCLUDED POLYNUCLEOTIDE AND METHOD OF PREPARATION THEREOF

(71) Applicant: YPF TECNOLOGÍA S.A., Ciudad Autónoma de Buenos Aires (AR)

(72) Inventors: María Laura Vera, Prov. de Buenos Aires (AR); Juan Ignacio Quelas, Prov. de Buenos Aires (AR); Maria Pilar Cadierno, Prov. de Buenos Aires (AR); Walter Alberto Vargas, Prov. de Buenos Aires (AR); María Leticia Legarto, Prov. de Buenos Aires (AR); Isabel Natalia Vega, Ciudad Autónoma de Buenos Aires (AR); Juan Martín Giussi, Prov. de Buenos Aires (AR)

(73) Assignee: YPF TECNOLOGIA S.A., Ciudad Autonoma de Buenos Aires (AR)

( * ) Notice: Subject to any disclaimer, the term of this patent is extended or adjusted under 35 U.S.C. 154(b) by 0 days.

(21) Appl. No.: 17/082,805

(22) Filed: Oct. 28, 2020

(65) Prior Publication Data
US 2021/0054734 A1 Feb. 25, 2021

Related U.S. Application Data

(63) Continuation-in-part of application No. 16/396,306, filed on Apr. 26, 2019, now Pat. No. 10,995,610.
(Continued)

(51) Int. Cl.
E21B 47/11 (2012.01)
C09K 11/06 (2006.01)
(Continued)

(52) U.S. Cl.
CPC ............ E21B 47/11 (2020.05); C09K 11/025 (2013.01); C09K 11/06 (2013.01); G01N 21/643 (2013.01); B82Y 15/00 (2013.01); B82Y 40/00 (2013.01)

(58) Field of Classification Search
None
See application file for complete search history.

(56) References Cited

U.S. PATENT DOCUMENTS 6,303,290 B1    10/2001  Liu et al.
2011/0277996 A1*  11/2011  Cullick ................. E21B 33/138
                                                       166/250.12
(Continued)

FOREIGN PATENT DOCUMENTS

CN          02731457 A    10/2012
WO     WO-2007/102023 A1   9/2007
(Continued)

Primary Examiner — John J Figueroa
(74) Attorney, Agent, or Firm — Muncy, Geissler, Olds & Lowe, P.C.

(57) ABSTRACT

Tracers for oil recovery, particularly fluorescent nanotracers comprising polynucleotides such as DNA strands. The tracer comprises a core-shell nanoparticle tailored according to the operation to be traced. It contains a fluorescent core comprising a target polynucleotide that allows the detection thereof in the field and a functionalized polymeric shell that provides increased stability in high salinity aqueous phases. A method for preparing said nanotracer by encapsulation of a polynucleotide.

19 Claims, 8 Drawing Sheets

Related U.S. Application Data

(60) Provisional application No. 62/663,728, filed on Apr. 27, 2018.

(51) Int. Cl.
    *C09K 11/02*         (2006.01)
    *G01N 21/64*         (2006.01)
    *B82Y 15/00*         (2011.01)
    *B82Y 40/00*         (2011.01)

(56) References Cited

U.S. PATENT DOCUMENTS

| | | | | |
|---|---|---|---|---|
| 2012/0283379 | A1* | 11/2012 | Auger | A61K 9/5115 |
| | | | | 524/556 |
| 2016/0075941 | A1* | 3/2016 | Duenckel | C09K 8/665 |
| | | | | 166/280.2 |
| 2018/0298277 | A1* | 10/2018 | Borrell | C09K 8/92 |
| 2018/0306027 | A1* | 10/2018 | Sherman | E21B 47/11 |
| 2020/0024506 | A1* | 1/2020 | Trudel | G01V 8/10 |

FOREIGN PATENT DOCUMENTS

| | | |
|---|---|---|
| WO | WO-2011/042564 A1 | 4/2011 |
| WO | WO-2011/058046 A1 | 5/2011 |

* cited by examiner

NANOTRACER FOR OIL RECOVERY COMPRISING AN OCCLUDED POLYNUCLEOTIDE AND METHOD OF PREPARATION THEREOF

CROSS REFERENCE TO RELATED APPLICATIONS

This application is a Continuation-in-Part of co-pending application Ser. No. 16/396,306, filed on Apr. 26, 2019, for which priority is claimed under 35 U.S.C. § 120; and this application claims priority of U.S. Provisional Application No. 62/663,728 filed on Apr. 27, 2018 under 35 U.S.C. § 119(e), the entire contents of all of which are hereby incorporated by reference.

FIELD OF THE INVENTION

The present invention relates to tracers used in the oil industry, particularly fluorescent nanotracers comprising a polynucleotide, adapted for oil recovery processes.

BACKGROUND OF THE INVENTION

Tracers are used in the oil industry, e.g. during fracking and recovery processes. Said tracers, frequently employed as particulates, allow either determining traceability and studying conductivity or connections between injection/production wells, or showing from which fracking stage a product under analysis is obtained.

During oil recovery processes and particularly in wells with marginal production, such as non-conventional wells, the presence of an aqueous phase with high salinity may affect the colloidal stability of tracers and negatively impact their performance.

International patent application WO 2007/102023 discloses tracers for the oil industry comprising metals as fluorescent complexes, in the form of finely divided particles.

Patent application CN 102731457 discloses an allyl-7-diethylamino-4-methylcoumarin-ammonium bromide monomer and a fluorescent polymer for use as a tracer in wells.

These patent documents neither disclose nanoparticles with a core-shell structure, nor their use in wells with high salinity aqueous phases.

Tracers that comprise polynucleotides, such as DNA, are disclosed e.g. in international patent applications WO 2011/058046 and WO 2011/042564. Methods for encapsulation of DNA strands into a silica particle using sol-gel techniques are described in U.S. Pat. No. 6,303,290 B1.

The prior art generally relates to tracers comprising radioactive elements or toxic compounds, such as fluorobenzoic acids. Additionally, tracers of the prior art are not suitable to be used in wells having an aqueous phase with high salinity. Tracers comprising polynucleotides obtained by the methods of the prior art often require blocking the pores of the matrix on which the polynucleotide is adsorbed, to avoid depletion of the polynucleotide as the tracer is carried.

Therefore, there is still a need of providing a tracer with nanometer dimensions with stability properties suitable for wells with high salinity aqueous phases, as well as improved properties related to rock retention and partitioning in an organic phase. Furthermore, there is a need to provide nanotracers comprising polynucleotides with increased traceability and selectivity, wherein the polynucleotide is not merely adsorbed on but rather occluded into a nanotracer core, as well as a method of preparation thereof.

BRIEF DESCRIPTION OF THE INVENTION

The advantageous characteristics and effects of the present invention are obtained by means of a superficial chemical functionalization of nanotracers (NT), as well as encapsulation of a polynucleotide into the NT core. The functionalization involves growth of a zwitterionic polymer on the NT surface, for example from amino groups ($-NH_2$) present therein; the encapsulation is related to the occlusion of the polynucleotide into a silica matrix.

Increased colloidal stability of nanotracers in highly saline media is obtained with the functionalization and improved traceability is obtained with the polynucleotide encapsulation, both of which allow overcoming the drawbacks of the prior art.

In a first aspect, an object of the invention is providing a nanotracer for oil recovering, said nanotracer comprising:
   a core containing a fluorescent cell, wherein the fluorescent cell comprises a polynucleotide, and
   a shell surrounding the core, wherein the external surface of the shell comprises a zwitterionic polymer.

In a preferred embodiment of the nanotracer of the present invention, the polynucleotide is a nucleic acid, preferably DNA, more preferably a DNA strand of about 200 pairs of bases.

In a preferred embodiment of the nanotracer of the present invention, the fluorescent cell comprises a silica matrix and a fluorophore. Preferably, the polynucleotide is occluded into the silica matrix.

In a preferred embodiment of the nanotracer of the present invention, the shell is bonded to anchoring sites of a core surface. The anchoring sites comprise amine groups.

In yet another preferred embodiment of the nanotracer of the present invention, the zwitterionic polymer comprises a polymer of [2-(methacryloyloxy) ethyl] dimethyl (3-sulfopropyl) ammonium hydroxide.

In a preferred embodiment, the nanotracer of the present invention is in the shape of a substantially spherical particle having a diameter of about 180 nm, wherein the core has an average size of about 80 nm.

In a second aspect, another object of the invention is a method of preparation of a fluorescent cell comprising a polynucleotide, the method comprising the steps of:
   a) mixing a fluorophore in an ethanol solution and a first silane under stirring, thereby obtaining a fluorescent adduct,
   b) mixing the fluorescent adduct obtained in a) with an ethanol solution comprising a polynucleotide, a base and a second silane under stirring, thereby obtaining a fluorescent cell, and
   c) washing the fluorescent cell.

In a preferred embodiment of the method of the present invention according to the second aspect, the first silane is (3-aminopropyl)triethoxysilane and the second silane is tetraethoxysilane.

In another preferred embodiment of the method of the present invention according to the second aspect, the fluorophore is fluorescein isothiocyanate.

In yet another preferred embodiment of the method of the present invention according to the second aspect, the base is ammonium hydroxide.

In a preferred embodiment of the method of the present invention according to the second aspect, the polynucleotide is a DNA strand of about 200 pairs of bases.

In a preferred embodiment of the method of the present invention according to the second aspect, the weight ratio of first silane to fluorophore is in the range of about 200 to about 300. Preferably, the weight ratio of first silane to fluorophore is of about 250.

In another preferred embodiment of the method of the present invention according to the second aspect, step a) and c) are carried out at room temperature for about 24 h.

In a third aspect, another object of the invention is a method of preparation of a nanotracer for oil recovery, the method comprising the steps of:
  providing a core containing a fluorescent cell, wherein the fluorescent cell comprises a polynucleotide,
  reacting a core surface with a polymerization initiator so as to obtain a particle with anchoring sites, and
  reacting the particle with anchoring sites with a monomer and in the presence of a catalyst and a ligand so as to produce the monomer polymerization and obtain a shell surrounding the core,
wherein the fluorescent cell is obtained by a method according to the second aspect of the present invention.

In another preferred embodiment of the method of the present invention, the polymerization initiator is bromoisobutyrate.

In yet another preferred embodiment of the method of the present invention, the monomer is [2-(methacryloyloxy)ethyl] dimethyl (3-sulfopropyl) ammonium hydroxide (MESDAH).

In a preferred embodiment of the method of the present invention, the catalyst comprises copper and the ligand is bipyridine.

In a preferred embodiment of the method of the present invention, the polymerization initiator is bromoisobutyrate and the step of reacting the shell surface with a polymerization initiator comprises adding anhydrous tetrahydrofuran (THF) to a dry NT powder, sonicating during 10 min and passing to an ice bath over platen. Preferably, this step is carried out under stirring at 800 rpm. Preferably, the dry NT powder mass is of about 0.01 g to 1 g, preferably about 0.1 g.

In a further preferred embodiment of the method of the present invention, the step of reacting the shell surface with a polymerization initiator further comprises adding 640 µL of triethylamine and 0.5 mL of bromoisobutyrate. Preferably, this step is carried out under nitrogen bubbling for 24 h, under stirring at 800 rpm at a temperature of 26° C. Even more preferably, a washing step is subsequently carried out.

In a preferred embodiment of the method of the present invention, the catalyst is Cu(I) or Cu(II) and the ligand is bipyridine and the step of reacting the particle with anchoring sites with a monomer and in the presence of a catalyst and a ligand comprises adding a NT solution to a Schlenk tube under nitrogen bubbling and stirring for 40 min at 600 rpm at a temperature of 25° C. Preferably, this step comprises adding 1.3894 g of MEDSAH dissolved in 10 mL of MeOH:$H_2O$ (4:1) and stirring for 40 min.

In another preferred embodiment of the method of the present invention, the step of reacting the particle with anchoring sites with a monomer in the presence of a catalyst and a ligand comprises adding bipyridine under nitrogen bubbling and stirring at 800 rpm for 45 min. Preferably, the catalyst is Cu(I) or Cu(II) and is added under stirring at 800 rpm at a temperature of 26° C. Even more preferably, a washing step is subsequently carried out.

The nanotracers of the present invention have the following advantageous characteristics, with respect to the nanotracers of the prior art.

They do not contain radioactive elements or fluorobenzoic acids, unlike currently available nanotracers.

They are fluorescent core-shell particles with nanometer dimensions, based on silicon and polymers, having enhanced properties as compared to the nanotracers of the prior art.

They are easily detected in the field by means of portable equipment such as a fluorescence spectrophotometer.

Due to the characteristics of their functionalized polymeric shell,
  they are stable in high salinity conditions,
  they are not retained in a rock or rock formation, and
  they do not show partition in oil phases, only flowing in the aqueous phase.

The preparation method thereof is versatile and allows obtaining "tailored" tracers as necessary. A number of tracers with different properties may be obtained with slight modifications in the core or the shell.

By modifying the polynucleotide, a large number of distinguishable nanotracer families can be obtained. Each nanotracer can be separately detected using techniques such as qPCR with specific primers as known in the art.

DETAILED DESCRIPTION OF THE INVENTION

The present invention will be described in detail below, with reference to the figures and examples.

The detailed description is provided in connection with such examples, but is not limited to any particular example. The scope is limited only by the claims, and numerous alternatives, modifications, and equivalents thereof. Numerous specific details are set forth in the following description in order to provide a thorough understanding. These details are provided for the purpose of example and the described techniques may be practiced according to the claims without some or all of these specific details. For clarity, technical material that is known in the technical fields related to the examples has not been described in detail to avoid unnecessarily obscuring the description.

As used herein, the term "about" means approximately, in the region of, roughly, or around. When the term "about" is used in conjunction with a numerical value or range, it modifies that value or range by extending the boundaries above and below the numerical value(s) set forth. In general, the term "about" is used herein to modify a numerical value(s) above and below the stated value(s) within a confidence interval of 90% or 95%.

As used herein, the term "fluorophore" is meant to include a moiety of a larger molecule or conjugate that can be induced to emit fluorescence when irradiated, i.e., excited, by electromagnetic radiation of an appropriate wavelength.

As used herein, the term "zwitterionic polymer" refers to a polymer with a molecular structure having functional groups with permanent negative charges and groups with permanent positive charges.

Figure 1:
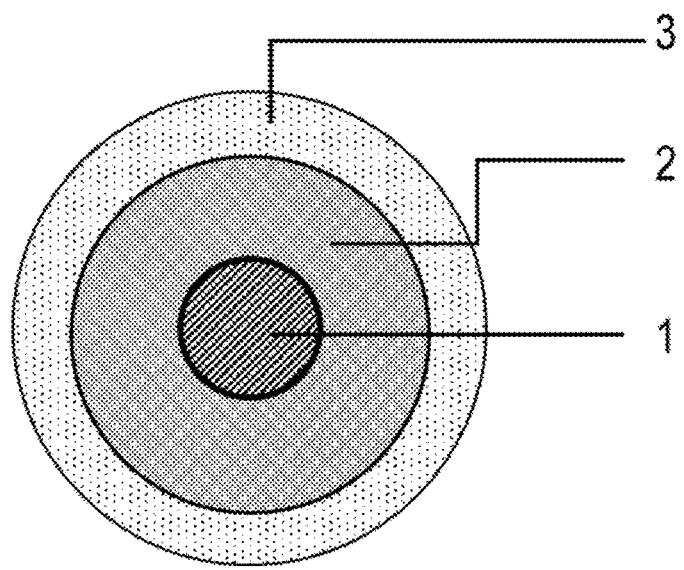
FIG. 1 shows a general diagram of the core-shell structure of the nanotracers of the present invention.

In an embodiment of the present invention shown in FIG. 1, the nanotracers have a core-shell structure comprising:
- a core, with the function of containing a fluorescent probe comprising a silica matrix and a colorant, typically fluorescent particles containing a fluorophore,
- a polynucleotide occluded into the core, specifically into the silica matrix, with the function of acting as an identifier of a specific nanotracer,
- a polymeric shell, with the function of i) protecting the colorant against the aqueous matrix, and ii) modifying the particle size,
- a "functionalization region" on the outer surface of the polymeric shell, corresponding to the zwitterionic region of the polymer chains, with the function of i) stabilizing the nanotracer in the aqueous matrix; and ii) generating an interaction with or affinity for the crude oil.

The average particle size of the core is about 100 nm, preferably 80 nm. The average particle size of the nanotracers of the present invention is about 150 nm, the particles having a substantially spherical shape.

The shape and reduced size allow the nanotracer particle not being retained within the formation pore throats.

The core comprises typically a silica ($SiO_2$) matrix and a colorant or fluorophore, preferably as fluorescent particles obtained by reacting a fluorescent adduct with a silane; the core is typically obtained by sol-gel techniques, as will be described below. The core further comprises a polynucleotide, such as a DNA or RNA, which is occluded into the silica matrix.

The fluorescent particles are detectable at reduced concentrations and their fluorescent property is unalterable in the medium to be traced, generally composed of crude oil and formation water. Said particles are stable during several months in the well conditions, such as salinity and temperature. Fluorescence color is selectable and allows detection in the field. The presence of the polynucleotide enables other detection techniques, such as those provided by molecular biology, resulting in increased traceability and selectivity.

The fluorophore may comprise fluorescein isothiocyanate (FITC) and/or other fluorescent compounds, preferably comprising an isothiocyanate functional group.

"Functionalization" of the shell outer surface consists of covalent anchoring of molecules, as will be described herein. In the present invention, functionalization involves zwitterionic polymers.

Unexpectedly, the presence of a zwitterionic polymer on the surface stabilizes the particles in the formation water with high salinity, as can be observed in the following exemplary embodiments. In addition, polynucleotide encapsulation is achieved with a synthesis method by which the polynucleotide is advantageously occluded into a silica matrix of the nanotracer core as the reaction proceeds, as opposed to merely being adsorbed on to the matrix surface.

Figure 2:
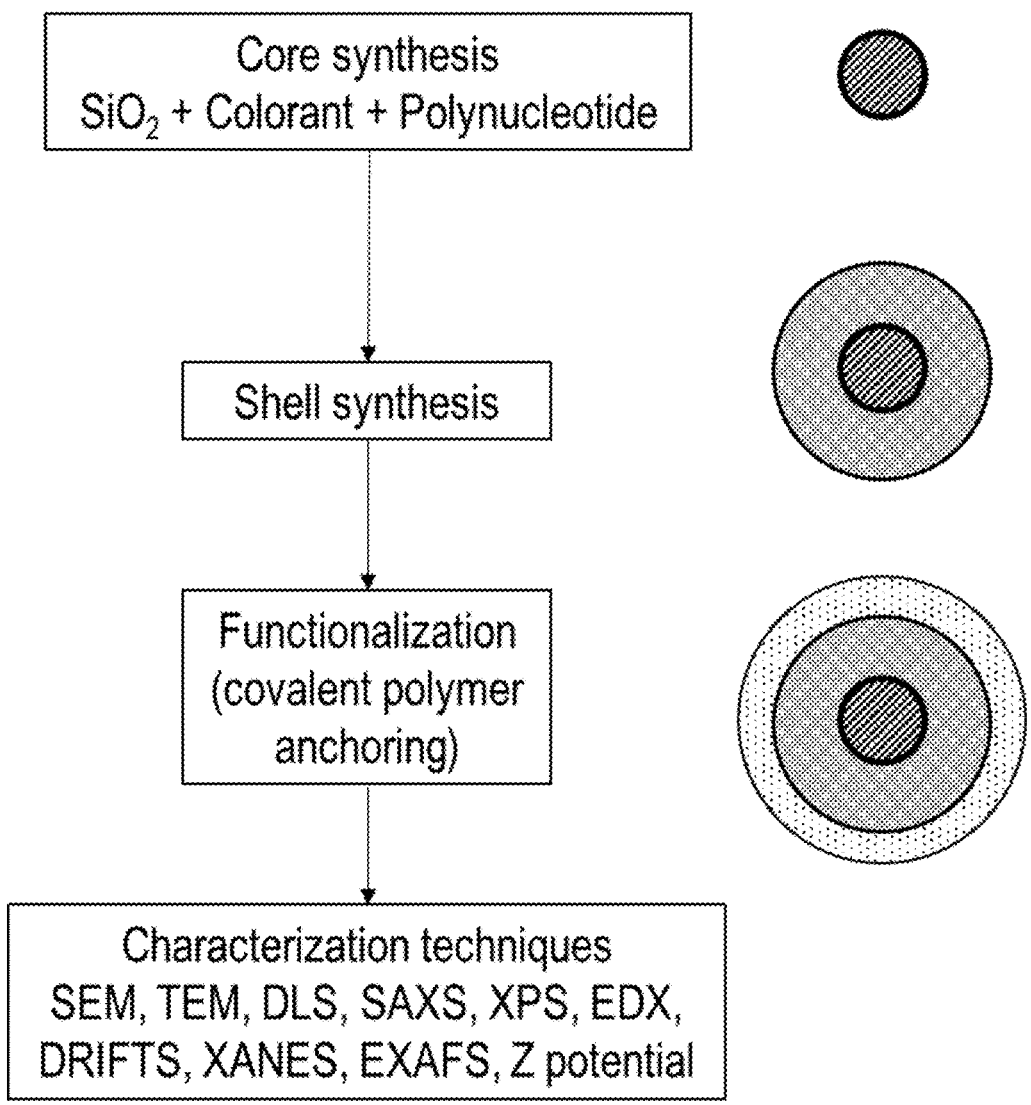
FIG. 2 shows a general diagram of the method for preparing nanotracers of the present invention.

FIG. 2 shows a diagram of the preparation method of the present invention that is illustrated in the following exemplary embodiments.

The characteristics of the formation water and crude oil composition of each well allows determining the nanotracer core and shell designs. The polynucleotide to be included in the nanotracer core can be selected according to the detection technique.

EXAMPLES

The nanotracers (NT) of the present invention are obtained by providing a core comprising a fluorescent cell, wherein a polynucleotide is encapsulated, and a functionalized shell surrounding the core.

Advantageously, the method of the present invention allows simultaneously encapsulating the polynucleotide and the fluorophore into the fluorescent cell.

a) Encapsulation of Polynucleotides

The polynucleotides to be incorporated into the nanotracer core can be engineered prior to the nanotracer synthesis. The polynucleotides may be artificially obtained and may not exhibit a biological function. Advantageously, a "target polynucleotide" encapsulated into the core acts as a "bar code" for the nanotracer.

Several target polynucleotides can be selected to fabricate a wide array of different nanotracers, each of which can be traced using well-known techniques in molecular biology.

The polynucleotides were encapsulated into the core using a sol-gel synthesis in ethanol medium, by which the polynucleotide is occluded into the silica matrix as this matrix is formed.

In a first brown glass bottle, 8 mL of absolute ethanol (EtOH) were mixed with 224 μL of an ethanol solution of fluorescein isothiocyanate (FITC) at 0.0216 mol/L and 615 μL of (3-aminopropyl)triethoxysilane (APTES), under stirring using a magnetic stirrer.

The reaction proceeds at room temperature and under continuous stirring for 24 h. After the reaction, a fluorescent adduct is generated for subsequent use in the synthesis of nanotracers. In the fluorescent adduct, the fluorophore molecule is covalently bonded to APTES.

In a second brown glass bottle, 9.7 mL of absolute ethanol are mixed with and 0.023 mg of DNA strands, i.e. DNA fragments with about 200 base pairs, suspended in 1.26 mL ultrapure water.

The mixture is homogenized by stirring for 5 minutes. Afterwards, 0.62 mL of $NH_4OH$ at 29% are added together with the obtained fluorescent adduct, along with 2.13 mL of absolute ethanol and 1.74 mL of tetraethoxysilane (TEOS).

The reaction proceeds for 24 h and the obtained product is washed, yielding a nanotracer precursor (NTP) that may be coated, for example with a functionalized shell, thereby obtaining nanotracers (NTs) that exhibit increased selectivity and traceability due to the presence of the polynucleotide.

By using the encapsulation method described, since the polynucleotide is advantageously occluded in the silica matrix, the molecules are protected from external agents due to the reduced permeability of the $SiO_2$ network. As a result, the obtained NTs do not require pore blockage or the use of molecular plugs in order to avoid polynucleotide depletion.

b) Synthesis and Characterization of Nanotracers

Functionalization of NTP involves the growth of a zwitterionic polymer from the NTP surface, from the amino groups.

The method of Atom Transfer Radical Polymerization (ATRP) was used to perform the polymer growth from the NTP surface.

In the present exemplary embodiment, bromoisobutyrate was used as polymerization initiator, covalently linked to NTPs by the surface amino groups already present in the NTPs surface. The amino groups are accessible due to the molecular distribution obtained by employing the previously described technique. The sites where the initiator covalently links to NTPs form "anchoring sites" for polymer growth.

The monomer used for the polymer growth is [2-(methacryloyloxy) ethyl] dimethyl (3-sulfopropyl) ammonium hydroxide (MEDSAH), a zwitterionic monomer having a sulfonate group and a quaternary amine providing a permanent negative charge and a permanent positive charge, respectively. Cu(I)/Cu(II) were used as catalyst and bipyridine was used as ligand.

The chemical structure of MEDSAH is:

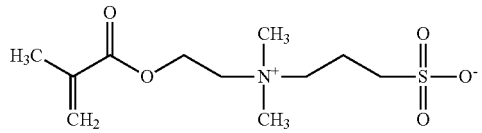

Figure 3:
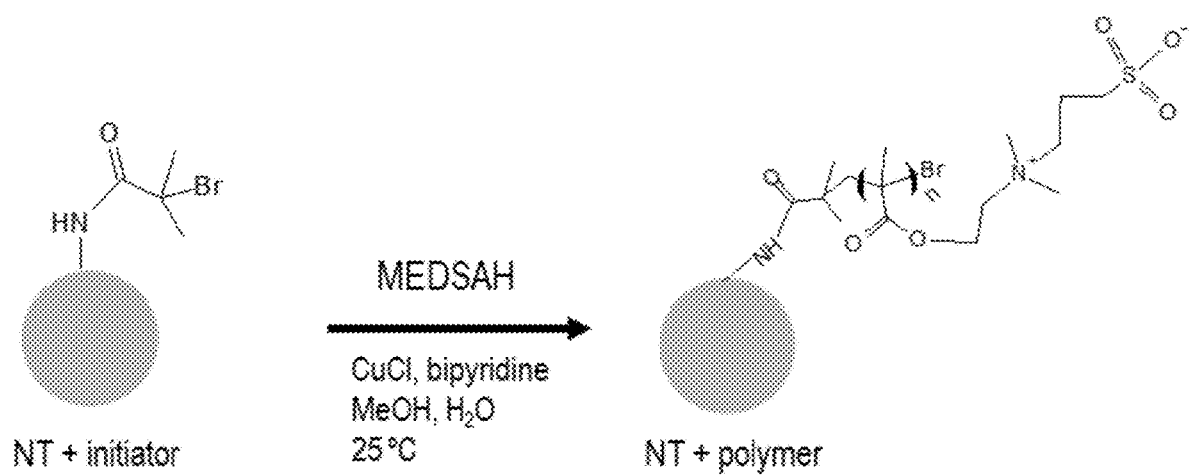
FIG. 3 shows a polymerization diagram starting from an anchoring site in an exemplary embodiment of the method of the present invention.

FIG. 3 shows a NTP polymerization diagram, starting from a single anchoring site, by way of example.

The synthesis process consists of the steps of NTP functionalization with initiator and polymer growth.

Generally, in order to covalently link the initiator to a $SiO_2$ substrate, either as a film or as a nanoparticle, a prior post-grafting step of the oxide with some alkoxide so as to incorporate an amino group, has to be performed. In the present method, since NTP already have surface amino groups, this prior step is not necessary, and the step of linkage to the initiator can be directly performed.

i) NTP Surface Functionalization with the Polymerization Initiator

Since this step requires anhydrous conditions, all glass material used therein is previously dried in an oven and the solvent used in this synthesis step, i.e. tetrahydrofuran (THF) is dried under reflux in the presence of Na until the water concentration is less than 5 ppm. This is evidenced by the presence of benzophenone in the reaction medium, showing an intense blue color when reaching the desired water concentration.

In order to perform NTP functionalization with bromoisobutyrate, a required mass amount of particles is placed into a tube along with a given volume of THF. Sonication is carried out for 10 min so as to homogenize the system and it is taken to a platen with magnetic stirring at 800 rpm. Then triethylamine is added in order to avoid formation of HBr and the reaction tube is placed in an ice/water bath while stirring. $N_2$ is bubbled for a few minutes so as to create an atmosphere free from humidity inside the tube and then the initiator is added, the ice bath is removed and replaced with a water bath at 26° C. The reaction goes on for 24 h under stirring and temperature conditions as mentioned. Finally, in order to wash the NT, most of the THF is evaporated in a rotavapor and then cycles of centrifugation, re-dispersion and sonication with ultrapure water, EtOH are repeated and two cycles with MeOH:water (4:1). The functionalized NTP are kept refrigerated in solution.

ii) Polymer Growth on the NTP Surface

In order to optimize the synthesis process and obtain a stable product in highly saline media, three synthesis protocols (A, B and C) were performed, studying variables like reaction time and presence of a moderator of catalytic activity. The general process, employed in the three cases, is detailed below.

A given volume of functionalized NTP with initiator is placed into a Schlenk tube, which is connected to a $N_2$ line and bubbled for 40 min. Additionally, the temperature is controlled at 26° C. as well as stirring at 800 rpm. A monomer solution is prepared in another Schlenk tube, MEDSAH is dissolved in MeOH:$H_2O$ (4:1) and $N_2$ is also bubbled for 40 min.

Bipyridine is added to the tube with the NTs, and passage of $N_2$ is further continued for 45 min. Then, the metal (Cu(I) and/or Cu(II)) that will form the catalyst complex with bipyridine is added. Finally, the monomer solution is added. The reaction is carried out for the time established in the protocol and then the synthesis product is washed by means of centrifugation, re-dispersion and sonication cycles in acidified water and Milli-Q water.

After the washing process, the obtained NTs are dispersed in THF and dried in oven for 24 h. They are stored for characterization.

Figure 4:
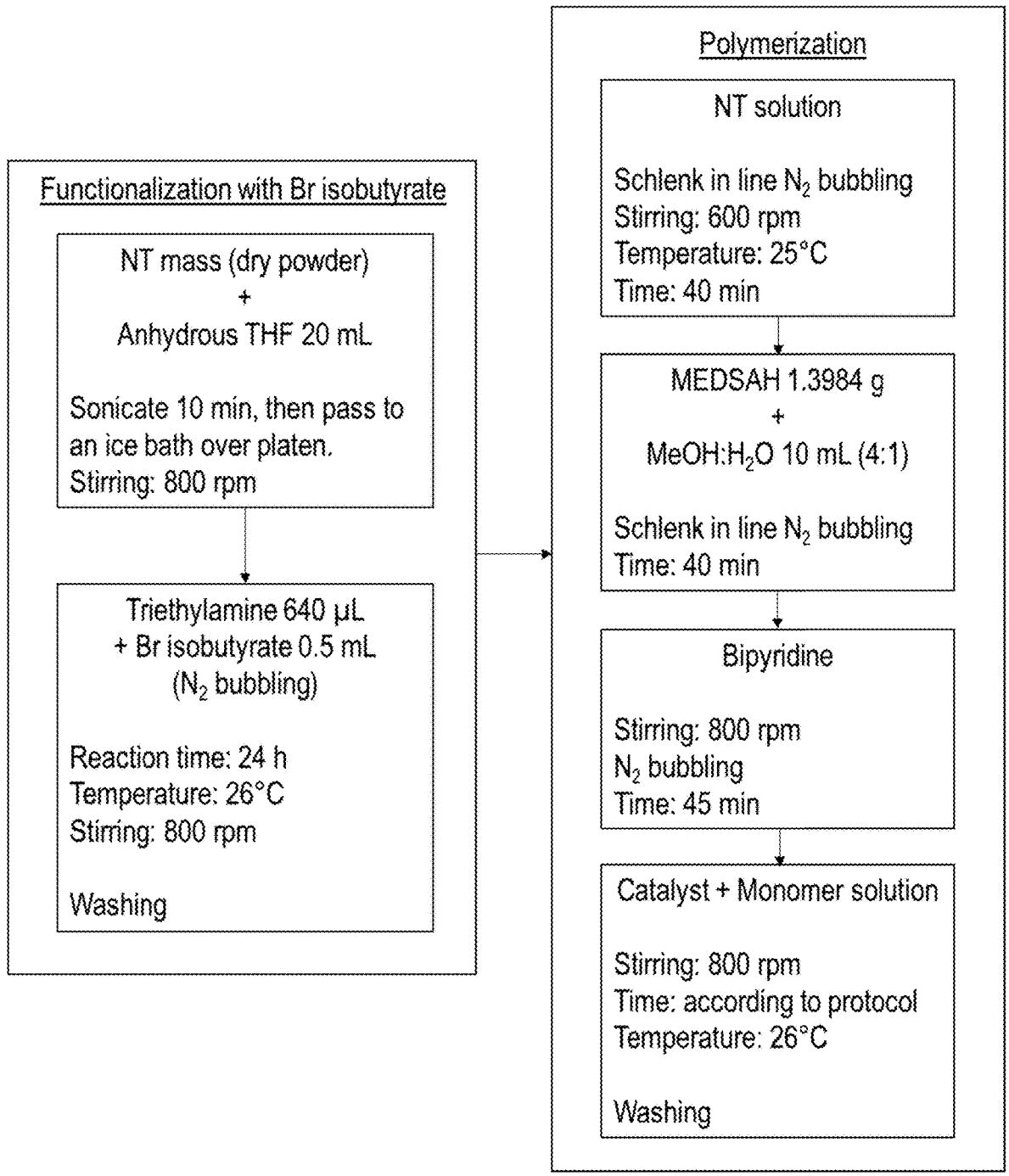
FIG. 4 shows a block diagram of an exemplary embodiment of the method of the present invention comprising functionalization steps with bromoisobutyrate and polymerization steps.

FIG. 4 shows a diagram of the experimental synthesis steps. Table 1 shows the molar ratios employed of each reactant and the polymerization time for each analyzed synthesis protocol. All syntheses were carried out in a final volume of 20 mL of MeOH:$H_2O$ (4:1), employing 0.1 g of functionalized NT.

TABLE 1

Analyzed molar ratios of reactants and polymerization time

| Protocol | MEDSAH | bipyridine | Cu (I) | Cu (II) | Time (min) |
|---|---|---|---|---|---|
| A | 5 | 1 | 0.5 | 0.3 | 15 |
| B | 5 | 1 | 0.5 | 0.05 | 15 |
| C | 5 | 1 | 0.5 | 0 | 15/30 |

Results and Discussion

The results corresponding to the three analyzed polymerization protocols (see Table 1) are discussed below. In each case, the colloidal stability of the synthesis product was assessed in synthetic formation water similar to that of the Grimbeek (GBK) field, located in the Chubut province, Argentina, with a salinity of about 20000 ppm.

i) Protocol A

The first analyzed synthesis was performed on the basis of previously disclosed protocols for similar polymerizations carried out on surfaces and not on particles. A combination of Cu (I) and Cu (II) was used as a catalytic system. Since the catalytic activity is given by the oxidation of a complex formed by Cu (I) and bipyridine, Cu (II), present since the reaction start, moderates said activity and leads to a controlled polymerization, according to the bibliography teachings.

Colloidal stability was assessed in these conditions for the solid product. When contacting the solid with formation water (similar to GBK), it remains on the surface forming drops, without dispersion. The product is completely immiscible with the solution.

Given the observed hydrophobicity, the product stability was assessed in an organic solvent with less polarity. Toluene was used. As a result, a total re-dispersion of the solid was achieved. This shows that the obtained product has oleophilic characteristics. The observed orange color corresponds to the presence of FITC fluorophore of the NT.

ii) Protocol B

In order to revert the hydrophobic characteristics observed in the product of protocol A, the synthesis was modified by reducing the employed amount of Cu (II) (see Table 1). In this way, it was sought to favor the polymer growth. The obtained product in these conditions could be dispersed in GBK water. A stable orange colloidal suspension was obtained.

From SEM images of the product, by means of ImageJ software the average diameter of the NT was estimated as being equal to 150±40 nm. The average diameter of the tracers prior to the surface modification is 80±20 nm. Therefore, this result proves the polymer growth on the surface. Polymerization generates a significant increase of 80% in the total diameter of NT. Besides, an increase in NT polydispersity is also observed.

Figure 5:
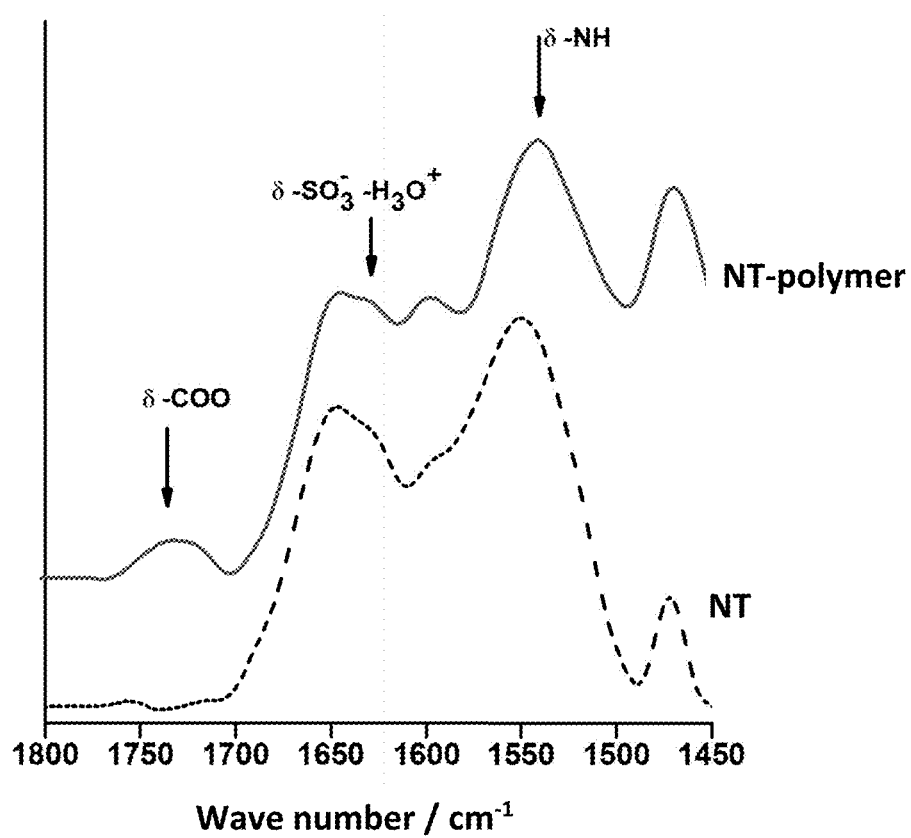
FIG. 5 shows DRIFTS spectra from samples of an exemplary embodiment of the present invention. Solid lines correspond to a NT-polymer and dotted lines correspond to a NT not polymerized or NT-initiator.

In order to qualitatively assess the presence of the polymer on the NT surface, the characterization of the obtained product was performed by means of DRIFTS technique. The spectrum corresponding to the tracers prior to polymerization was used as a blank for this analysis. FIG. 5 shows both spectra.

In the spectra obtained by DRIFTS for samples NT and NT-polymer of FIG. 5, it may be observed the appearance of two bands after polymerization. A new signal in the zone at 1730 $cm^{-1}$ is allocated to C=O stretching of ester group, and that corresponding to 1630 $cm^{-1}$ to O—H stretching in —$SO_3^-$—$H_3O^+$, both functional groups being present in the chemical structure of the monomer (MEDSAH). Therefore, the presence of the polymer is corroborated, according to what is observed by SEM.

Figure 6:
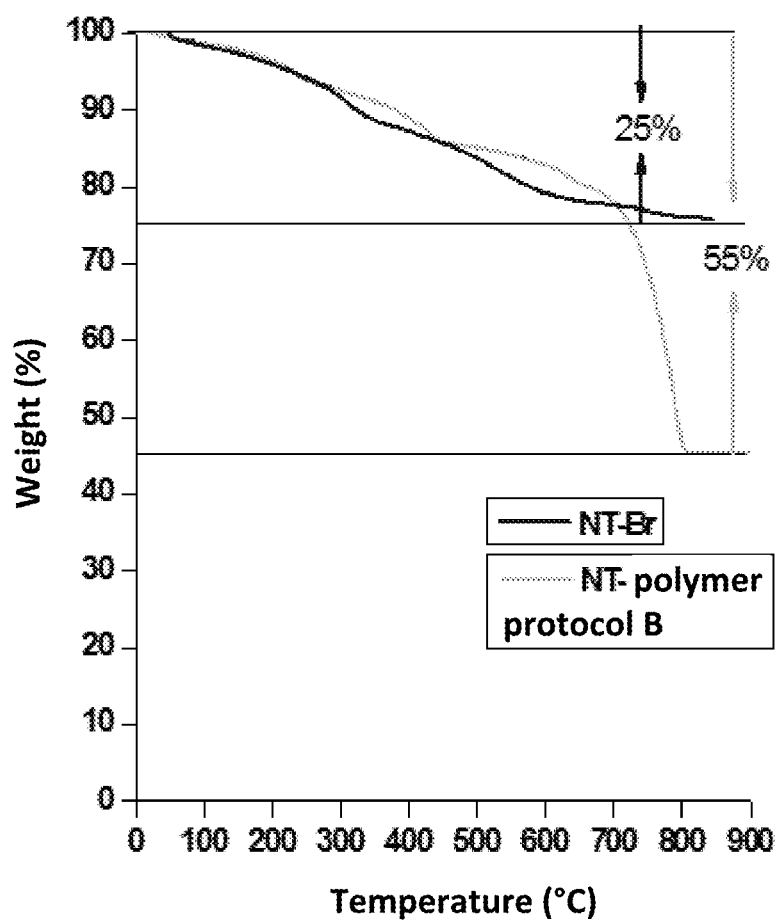
FIG. 6 shows the results of an analysis by TGA of samples from exemplary embodiments of the invention, representing NT-initiator (dark grey) and NT-polymer (light grey) species.

In order to estimate the mass of the polymer grown on the NT surface, a thermo-gravimetric analysis (TGA) of the NT functionalized only with the initiator (NT-Br) and with the polymer (NT-polymer) was performed, as shown in FIG. 6. Taking the sample of NT-Br as a reference, a 30% increase in the mass loss in the NT-polymer sample was observed, corresponding said mass excess to the grown polymer.

Considering the results obtained from the studies performed in solution, it can be concluded by means of microscopy and TGA that the NT were polymerized in a considerable extent.

iii) Protocol C

In Protocol B, by reducing the percentage of added Cu (II), an improvement in the product stability in highly saline medium was achieved. In order to reduce the thickness of the polymeric layer and thereby reducing the increase of NT size, Protocol C was performed. In this protocol Cu (II) was completely removed from the synthesis (as shown in Table 1).

The colloidal stability was also assessed on the obtained solid. This product could be re-dispersed in formation water (GBK).

Characterization by means of DRIFTS, TGA and SEM allow assessing the impact of protocol change in the polymer growth.

CONCLUSIONS

By means of the ATRP method, zwitterionic polymers based on MEDSAH monomer were synthetized, the polymers covalently anchored through the surface amino groups of the tracer cores. FIG. 4 shows a diagram of the method to obtain the tracers of the present invention using Protocol B.

By way of small modifications in the synthesis protocol, it was possible to obtain three different products. Two of the obtained products were colloidally stable in solutions of high salinity similar to formation water of GBK, keeping their own orange color from the presence of FITC fluorophore.

The product corresponding to Protocol A could not be dispersed in the aqueous solution. It showed a clear affinity for the oil phase, since it got easily stabilized in toluene.

Therefore, according to the medium where the tracer is sought to be stabilized, the corresponding synthesis conditions could be selected. Protocols B or C, for tracers stable to high salinity. Protocol A, for tracers in oil phases.

b) Characterization of Nanotracers in Porous Medium

Figure 7:
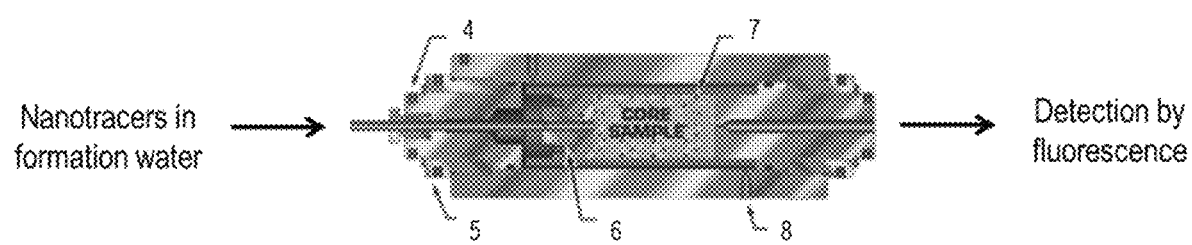
FIG. 7 shows a diagram of an experimental device used for the characterization of the nanotracers of the present invention in a porous medium.

The performance assessment of nanotracers in rock, using a "BentheimerSandstone" rock model, shows that the particles of the nanotracers of the present invention pass through the rock without significant retention in high salinity conditions. FIG. 7 shows the experimental device used in the characterization. The device comprises an end cap (4), an end plug (5) as well as a floating distribution plug (6). The core sample is placed inside a sleeve (7), subjected to a common radial and axial pressure by means of orifices (8) for introducing a pressure exerting fluid.

To evaluate the NT retention in the experimental device, the relative fluorescence intensity is measured at the outlet and represented as a function of the injected volume.

The behavior of the nanotracers of the present invention is similar to that disclosed in the technical literature for more complex particles, with a more expensive synthesis and involving a detection step in laboratory instead of in the field.

Figure 8:
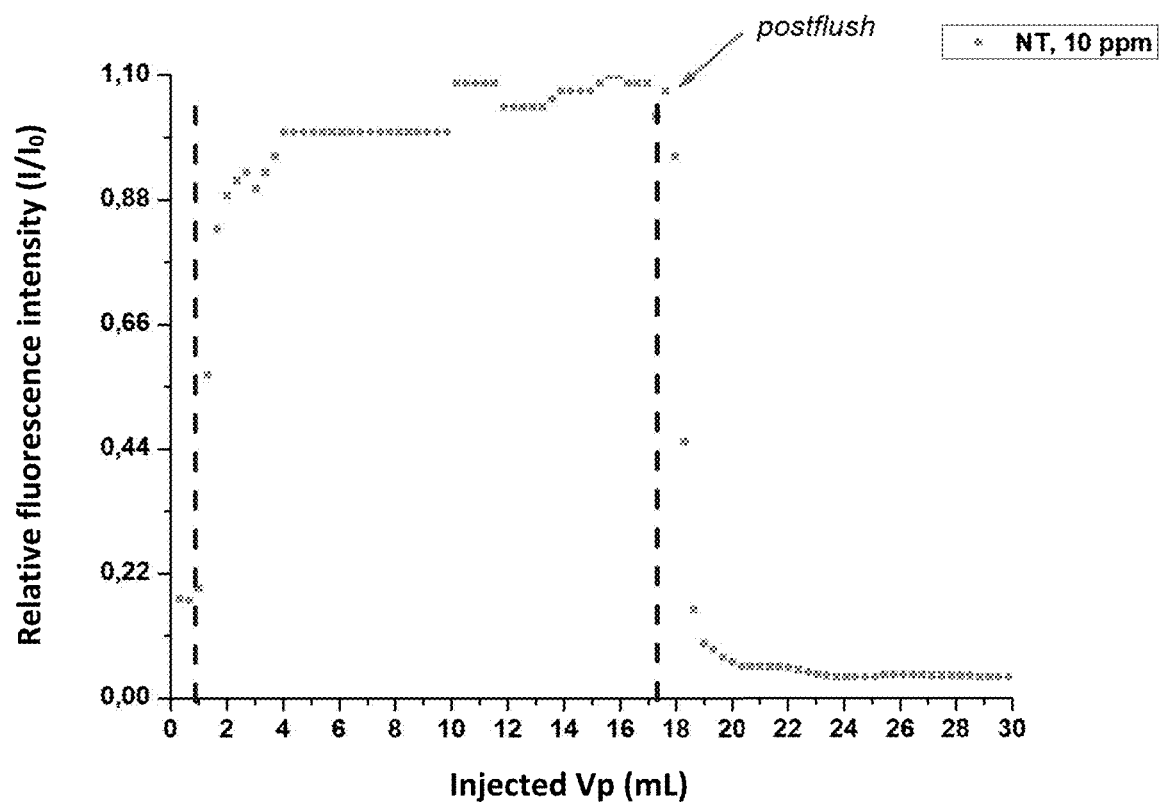
FIG. 8 shows the results obtained for NT recovery using the experimental device of FIG. 7.

FIG. 8 shows the recovery curve of the NT as they pass through porous medium. A dispersion of 10 ppm of NT was injected and the sweeping was finished with a synthetic 9000 ppm salinity water postflush, keeping a constant flow rate. It can be observed that obtained curve is similar to that of an ideal tracer, i.e. without retention. Using calculations based on mass balance calculations, a recovery of about 100% was estimated.

c) Detection of Nanotracers Using PCR and qPCR

As previously mentioned, the nanotracers of the present invention can be detected using molecular biology techniques. Specifically, nanotracers comprising DNA, can be detected by a Polymerase chain reaction (PCR).

A sample comprising nanotracer particles is suspended in a 1 mol/L NaCl solution, at a concentration of 57 µg/mL and sonicated for 15 minutes.

The nanotracer particles are then treated with a concentration solution of $H_2SO_4$ to remove the polymeric shell and expose the fluorescent core. To this end, the sample is suspended in 1.5 mL of $H_2SO_4$ and boiled for 10 minutes. The $H_2SO_4$ is subsequently washed with ultrapure water. This step is repeated 3 times until the suspension reaches neutral pH.

The nanotracer particles cores, i.e. the nanoparticles are then treated with HF, in order to dissolve the silica matrix. In a first test tube, 20 µL of core nanopatricles are resuspended with 80 µL of a 1% w/w HF solution. In a second test tube, 20 µL of water are mixed with a 80 µL of a 1% w/w HF solution. Dissolution can be visually assessed.

The tubes are incubated for 1 minute at room temperature and centrifuged at 16160 g for 5 min at room temperature, so that undigested nanoparticles are removed.

5 μl of supernatant are added to 495 μL of water to obtain a 1/100 diluted solution. 2 or 5 μL of this solution are used as template for a PCR and/or qPCR with 20 μL final volume, with the composition in Table 1 (PCR) and Table 2 (qPCR).

TABLE 1

PCR components

| Component | Volume (μL) |
| --- | --- |
| Buffer | 4 |
| dNTPs | 1.6 |
| Forward primer | 1 |
| Reverse primer | 1 |
| Template | 2 |
| DMSO | 2 |
| DNA Polymerase | 0.1 |
| Agua | 8.3 |
| Total | 20 |

TABLE 2 qPCR components

| Component | Volume (μL) |
| --- | --- |
| SYBRGreen ® mastermix (2x) | 10 |
| Primers mix | 5 |
| sample | 5 |
| Total | 20 |

The PCR was carried out at 2 minutes at 95° C., followed by 28 amplification cycles of 15 minutes at 95° C., 10 minutes at 54.8° C. and 20 minutes at 72° C., followed by 2 minutes at 72° C.

The qPCR was carried out using a Hold step of 10 minutes at 95° C., followed by a PCR step of 15 seconds at 95° C. and 1 minute at 63° C., and a Melt Curve Stage of 15 seconds at 95° C. and 1 minute at 60° C. and dissociation with 15 seconds at 95° C.

The amplifications results using the nanotracers of the present invention were positive, meaning that the encapsulated DNA can be successfully detected, and amplified providing an advantageous nanotracer with increased stability, particularly suited for oil recovery operations.

d) Comparative Example

The protocol described in the previous examples was varied, in that the fluorescent adduct was added after DNA encapsulation, i.e. a sequential approach was tested, wherein no fluorescent cell is formed. TEOS was added in two stages.

Using this alternative protocol for obtaining the nanotracers, the corresponding PCR results were negative, indicating that this alternative does not result in advantageously identifiable nanotracers.

The invention claimed is:

1. A nanotracer for oil recovery, comprising
a core containing a fluorescent cell, wherein the fluorescent cell comprises a polynucleotide,
a shell surrounding the core, the outer surface of the shell comprising a zwitterionic polymer.

2. The nanotracer according to claim 1, wherein the polynucleotide is a nucleic acid.

3. The nanotracer according to claim 1, wherein the fluorescent cell further comprises a silica matrix and a fluorophore.

4. The nanotracer according to claim 3, wherein the polynucleotide is occluded into the silica matrix.

5. The nanotracer according to claim 1, wherein the shell is attached to anchoring sites of a core surface.

6. The nanotracer according to claim 1, wherein the zwitterionic polymer comprises a polymer of [2-(methacryloyloxy) ethyl] dimethyl (3-sulfopropyl) ammonium hydroxide.

7. The nanotracer according to claim 1 in the shape of a substantially spherical particle having a diameter of about 180 nm, wherein the core has an average size of about 80 nm.

8. A method of preparation of a fluorescent cell comprising a polynucleotide, the method comprising the steps of:
 a) mixing a fluorophore in an ethanol solution and a first silane under stirring, thereby obtaining a fluorescent adduct,
 b) mixing the fluorescent adduct obtained in a) with an ethanol solution comprising a polynucleotide, a base and a second silane under stirring, thereby obtaining a fluorescent cell, and
 c) washing the fluorescent cell.

9. The method of claim 8, wherein the first silane is (3-aminopropyl)triethoxysilane and the second silane is tetraethoxysilane.

10. The method of claim 9, wherein the fluorophore is fluorescein isothiocyanate.

11. The method of claim 10, wherein the base is ammonium hydroxide.

12. The method of claim 8, wherein the polynucleotide is a DNA strand of about 200 pairs of bases.

13. The method of claim 8, wherein the weight ratio of first silane to fluorophore is in the range of about 200 to about 300.

14. The method of claim 13, wherein the weight ratio of first silane to fluorophore is of about 250.

15. The method of claim 8, wherein step a) and c) are carried out at room temperature for about 24 h.

16. A method of preparation of a nanotracer for oil recovery, the method comprising the steps of:
 providing a core containing a fluorescent cell, wherein the fluorescent cell comprises a polynucleotide,
 reacting a core surface with a polymerization initiator so as to obtain a particle with anchoring sites, and
 reacting the particle with anchoring sites with a monomer and in the presence of a catalyst and a ligand so as to produce the monomer polymerization and obtain a shell surrounding the core,
wherein the fluorescent cell is obtained by the method of any one of claims 8 to 15.

17. The method according to claim 16, wherein the polymerization initiator is bromoisobutyrate.

18. The method according to claim 17, wherein the monomer is [2-(methacryloyloxy) ethyl] dimethyl (3-sulfopropyl) ammonium hydroxide.

19. The method according to claim 18, wherein the catalyst comprises copper and the ligand is bipyridine.

* * * * *